United States Patent [19]

Mercier

[11] 4,448,217

[45] May 15, 1984

[54] ACCUMULATOR HAVING BLADDER IN EXPANSION LIMITING CONTACT WITH CASING

[75] Inventor: Jacques H. Mercier, Stamford, Conn.

[73] Assignee: The Normand Trust, New York, N.Y.

[21] Appl. No.: 424,363

[22] Filed: Sep. 27, 1982

[51] Int. Cl.³ .......... F16L 55/04

[52] U.S. Cl. .......... 138/30

[58] Field of Search .......... 138/30; 220/85 B

[56] References Cited

U.S. PATENT DOCUMENTS 2,351,761 6/1944 Hanna .......... 138/30

2,931,392 4/1960 Mercier .......... 138/30

3,138,176 6/1964 Mercier .......... 138/30

3,580,290 5/1971 Sugimura .......... 138/30

FOREIGN PATENT DOCUMENTS 1245717 9/1971 United Kingdom .......... 138/30

*Primary Examiner*—John W. Shepperd

*Attorney, Agent, or Firm*—Arthur B. Colvin

[57] ABSTRACT

The present invention relates to a hydraulic accumulator and particularly to a low cost pressure accumulator having improved life cycle and operating characteristics. More particularly, the invention pertains to a hydraulic accumulator wherein means are provided for prolonging the bladder life and effecting an improved seal at the oil port end of the device.

10 Claims, 3 Drawing Figures

ACCUMULATOR HAVING BLADDER IN EXPANSION LIMITING CONTACT WITH CASING

BACKGROUND OF THE INVENTION

1. Field Of The Invention

The present invention is in the field of hydraulic accumulator devices and pertains more particularly to a low cost accumulator device having improved life cycle and seal characteristics.

2. The Prior Art

It is known to provide hydraulic systems with accumulator devices which generally comprise a pressure vessel interiorly divided into two chambers by an expansible and contractible bladder member of elastomic material or the like. The accumulator acts both as an energy storage device and as a pulsation dampener.

The gas chamber is charged with gas under pressure. When the pressure of the hydraulic system exceeds that of the gas chamber separated from the hydraulic system by the bladder, oil enters the vessel, causing the gas entrapped by the bladder to be compressed and deforming the bladder. When the pressure in the hydraulic system drops below that of the gas compressed within the bladder, hydraulic fluid is forced outwardly from the accumulator and, thus, the stored energy is returned to the system.

Heretofore accumulator devices of the type described have been quite costly, being formed of forged or machined pressure vessels having welded and/or other complex sealing arrangements for integrating the parts, elements or components of the accumulator.

There exists a substantial market for accumulator devices which may be fabricated at lower cost. Attempts have been made to provide low cost accumulators. One such device, which is more particularly described in pending U.S. application Ser. No. 305,522, filed Sept. 24, 1981, now U.S. Pat. No. 4,364,416 represents an attempt to reduce the cost of the accumulator by employing, in lieu of a forged or cast pressure vessel, a hydraulically formed, relatively thin walled spherical metal member. The device of the noted application includes a bladder member clampingly mounted between an output connection fixture intended to be coupled to the hydraulic system and the pressure vessel proper.

The subject device, while commercially acceptable, has been accompanied by a somewhat higher bladder failure rate and incidence of leakage than is desirable.

I have discovered that the bladder failure is attributable, in a measure, to the uncontrolled and rapid expansion and contraction of the bladder, which results in unequal stressing of the bladder components. As a result of such unequal stressing as, for example, may be experienced when a sudden and great surge of fluid is forced into the interior of the bladder, the bladder is deformed in an unpredictable manner.

In the course of such expansion, certain areas of the bladder may be stretched to a far greater degree than others causing a permanent set and consequent overlapping of areas of bladder with resulting cracking. The condition noted produces a progressive deterioration of the bladder since an area, once over-stressed, will be weakened, and subsequent pulses of hydraulic input are more likely to re-stress the previously weakened areas.

SUMMARY OF THE INVENTION

The present invention is directed to an improved low cost hydraulic accumulator device especially adapted for use in low and medium pressure applications.

The device is characterized by the provision of a bladder which is mounted within the pressure vessel, the bladder being mounted over a central support casing. The bladder is clamped at its lower end between the base of the casing and the pressure vessel, and at its upper end constrained between the upper end of the casing and the interior wall of the pressure vessel remote from the oil port end of the vessel.

In this manner a controlled and predictable expansion of the bladder is assured, eliminating or minimizing the tendency for the formation of localized high stress areas.

Preferably, in addition, the wall thickness of the bladder is arranged such that the bladder includes thickened areas at the base and further thickened areas positioned in the clamping zone between the casing and the other end of the pressure vessel whereby axial expansion of the bladder in the areas aligned with the central axis of the device is prevented and stretching of the bladder is limited to the areas external of the clamped areas.

It is accordingly an object of the invention to provide an improved low cost hydraulic accumulator device characterized by long bladder life and in the formation of a simple yet effective seal at the base end between the bladder and other structural components.

To attain these objects and such further objects as may appear herein or be hereinafter pointed out, reference is made to the accompanying drawings, forming a part hereof, in which.

Figures 1, 2, 3:
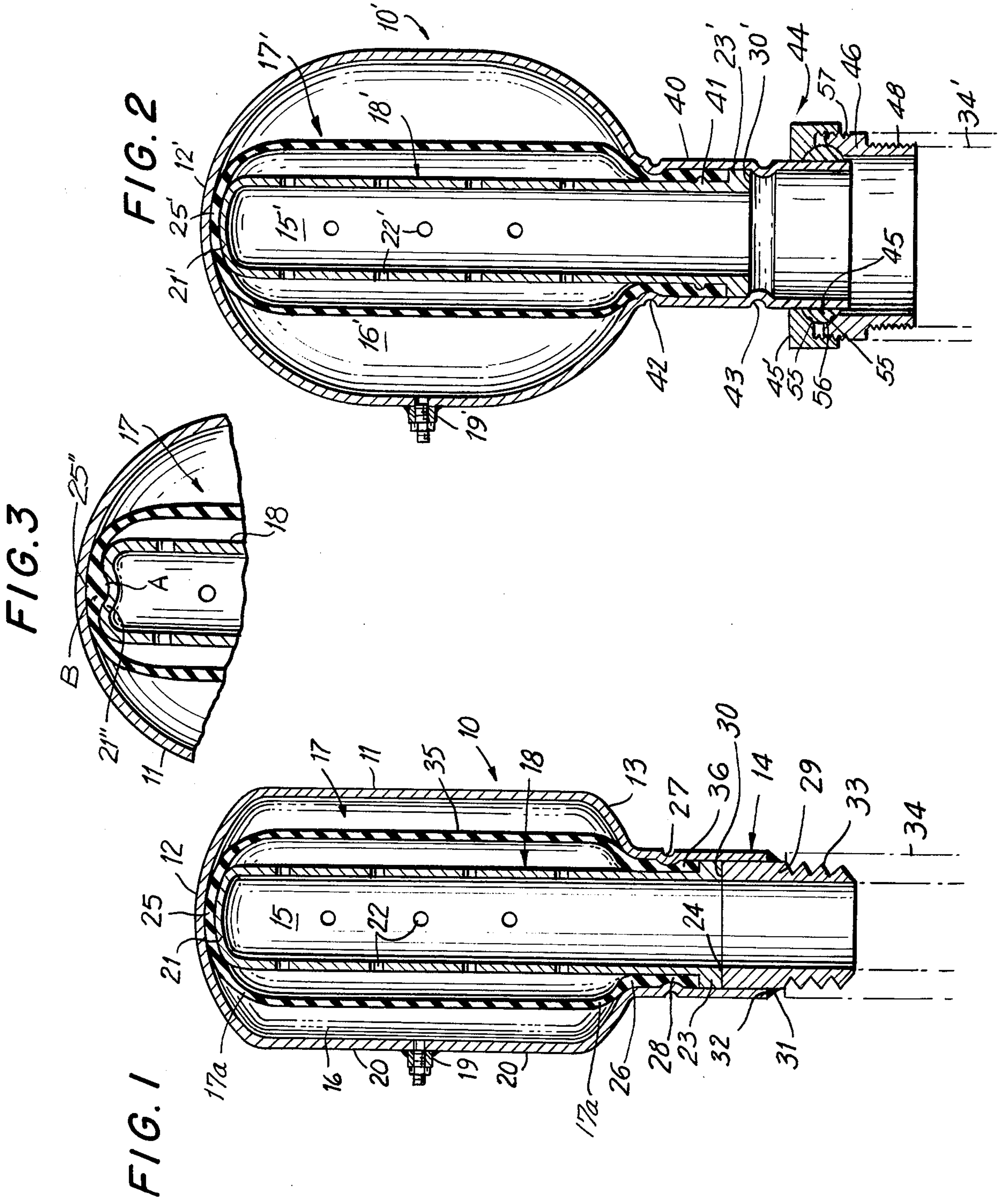
FIG. 1 is a vertical sectional view through a form of accumulator in accordance with the invention.
FIG. 2 is a vertical sectional view through an accumulator device in accordance with a further embodiments of the invention.
FIG. 3 is a detailed sectional view of still a further embodiment of the invention.

Referring now to the drawings, and particularly to FIG. 1, there is shown an accumulator apparatus 10 including a thin wall pressure vessel 11 preferably formed by hydraulic distension of a metal blank, the vessel having parti-spherical upper and lower end portions 12,13 respectively. The pressure vessel includes a cylindrical neck portion 14.

Although the neck portion 14 is illustratively shown as having an inner diameter less than one-half the inner diameter of the cylindrical portion 20 of vessel 11 (FIG. 2), for smaller volume accumulators i.e. less than one quart, it is preferred to have the inner diameter of neck 14 more than one-half the inner diameter of cylindrical portions 20 (FIG. 1).

The interior of the vessel is divided into oil and gas chambers 15,16, respectively, by an expansible bladder assembly 17. In the views of FIG. 1 and FIG. 2, the bladder 17 is shown in partially distended condition, i.e. oil or like hydraulic fluid has been forced into the chamber 15, causing the bladder 17 to be displaced from the intimate or lining contact of the support casing 18 to which it is normally forced by the gas pressure in chamber 16.

A gas charging assembly 19 may be mounted in the cylindrical section or area 20 of the pressure vessel which lies between the parti-spherical upper and lower ends 12,13 of the vessel. Preferably the axial extent of the cylindrical portion 20 of the vessel is about equal to the sum of the axial extents or dimensions of the parti-spherical end portions 12,13, i.e. the cylindrical area will be approximately one-half of the total length of the pressure vessel.

The casing 18, which is formed of a rigid metal or plastic, and which is generally cylindrical throughout its length, includes a closed and rounded upper end portion 21. A plurality of transversely extending apertures 22 are formed through the casing 18 to permit the flow of oil or hydraulic fluid through the casing wall. The cross-sectional extent of the apertures 22 is sufficiently small to preclude the possibility of the bladder being extruded through the apertures under the pressure conditions existing in the gas chamber 16.

The casing 18 includes an enlarged annular shoulder 23 adjacent its lower end 24.

The bladder assembly 17 includes a thickened upper portion 25 and a thickened annular coller 26 adjacent its lower end.

The device is assembled by sleeving the casing 18 having the bladder assembly 17 mounted thereover through the neck portion 14 of the pressure vessel. With the parts assembled as noted an annular depression 27 is effected in the neck portion 14 as by a spinning crimping or roll forming step, whereby a gas and fluid-tight seal is formed in the annular zone or area 28 in registry with and surrounding the depression 27.

As is clearly apparent from an inspection of FIG. 1, the thickened portion 25 of the bladder is pressed between the upper end 21 of the casing and the portion of the inner wall defining the center of the upper end 12 of the pressure vessel.

In order to effect connection of the accumulator into a hydraulic system, a tubular nipple 29 is mounted in the lower end of the neck 14 in end-abutting relation between the lower end 24 of the casing and the upper end 30 of the nipple 29. Thereafter an annular weld 31 may be formed between the nipple and the lowermost end 32 of the pressure vessel.

The nipple includes a threaded portion 33 which may be threadedly interconnected with the oil line 34 of a hydraulic system.

The junctions 17*a* of the bladder between its central or sidewall portion 35 and the area 25 clamped between the pressure vessel 11 and casing 18 at the upper end of the accumulator and between the sidewall portion 35 and thickened area 26 clamped between the vessel 11 and casing 18 adjacent the lower end of the bladder, are preferably formed of thinner elastomeric material.

It will also be observed that the formation of the annular indent 27 captures an increment 36 of the thickened area 26 of the bladder between the annular indent 27 and the shoulder 23.

There is thus formed an effective and leak-resistant seal between the components of the apparatus.

As will be observed from the preceding description, when fluid is introduced into the interior of the oil chamber 15 from hydraulic line 34, through nipple 29 the bladder is caused to expand. The expansion in the illustrated embodiment is restricted to the side area 35 of the bladder since the bladder is clamped at its upper and lower ends in the manner aforesaid.

The clamping action described plus the thinner nature of the material of the side wall of the bladder assures that rapid increases of pressure into the interior of the device will not cause a doubling or uncontrolled distension of the bladder but, rather, will provide a radial and even expansion of the bladder components, with the result that no areas of special stress will be developed.

In the embodiment of FIG. 2, wherein like parts have been given like reference numerals, the sole differences reside in the sealing arrangement at the lower end of the accumulator.

In the configuration of FIG. 2, the neck portion 40 of the pressure vessel 10′ is elongated. An annular ridge 41 is formed on the outer circumference of the casing 18′ in spaced relation to the shoulder 23′.

In this form of device, the seal between the pressure vessel, bladder, and casing is defined by upper and lower spun or otherwise formed indentation 42,43. The upper indentation 42 compresses thickened portions of the bladder against the wall of the casing and the lower indentation 43 is formed in underlapping relation of the lower end 30′ of the casing. In this manner there is formed a tight seal at the base of the device between the pressure vessel, bladder, and casing, the lower indentation 43 serving axially to lock the casing against endwise or axial shifting movement relative to the pressure vessel.

Connection between the neck 40 of the pressure vessel and the hydraulic line 34′ is effected by a conventional union type hydraulic pipe fitting 44. The fitting 44 which may be of the "Ermeto" type comprises a collar 45, a locking nut 45′ and a nipple 46 all encompassing the neck 40. The nipple 46 has a thread 48, enabling mounting to the hydraulic line 34′.

The locking nut 45 and the nipple 46 have concave conformations 55 on their inner peripheries designed to coact with a complementary convex conformation 56 on the outer periphery of collar 45 to deform the collar inwardly when the nut 45′ is tightened on the threaded outer periphery 57 of nipple 46. Thus, the neck 40 is secured to the nipple 46 with an effective liquid tight seal.

Optionally and preferably, the pressure vessel of the illustrated embodiments may be formed as by hydraulic distension of an integral metallic blank to the configuration shown. Naturally, the vessel will not have the burst resistance of a thicker forged or cast vessel.

In the emboidment shown in FIG. 3 the upper end portion 21″ of the casing 18 has a central depression or cavity A and the thickened portion 25″ of the bladder has a axially depending protuberance B preferably formed integral therewith and aligned with cavity A.

Thus, when the casing 18 is pressed into the pressure vessel 11, the axial portion of the bladder will be dependably retained in position without likelihood of radial movement to avoid wear of the retained end of the bladder.

From the foregoing it will be understood that there is provided a hydraulic accumulator device which may be inexpensively produced from a minimum number of parts or components by a simple series of manufacturing steps. The device is characterised by increased life of the bladder member which, by virtue of its being clamped both on its open and closed ends and, preferably, also by the fact that such upper and lower ends are of thicker material than the side wall portions, is constrained to expand in a manner which will minimize localized areas of stretching.

As will be evident to those skilled in the art and familiarized with the instant disclosure, numerous variations in details of construction may be made in the described embodiments without departing from the spirit of the invention. Accordingly, the invention is to be broadly construed within the scope of the appended claims.

Having thus described the invention and illustrated its use, what is claimed as new and is desired to be secured by Letters Patent is:

1. A low cost, hydraulic accumulator device comprising a pressure vessel having parti-spherical upper and lower end portions and a cylindrical section interposed between said end portions, a neck portion integral with and extending outwardly from said lower end portion, a rigid, hollow, generally cylindrical casing extending through said neck portion and into said vessel, said casing have a closed upper end and an open lower end defining an oil port, said casing including a plurality of transversely directed throughgoing apertures in the cylindrical portion thereof, a resilient, deformable elastomeric bladder member mounted over the outer surface of and conforming to said casing and dividing said vessel into two chambers, said bladder member including a closed upper end portion, an open mouth portion at the lower end, and a thickened collar portion adjacent said mouth portion and surrounding said lower end of said casing, said collar portion being clampingly secured between said lower end of said casing and said neck of said vessel to define a seal, a portion of said closed end of said bladder being pressed between said upper end of said casing and said upper end of said pressure vessel, whereby the central portion of said bladder member is constrained against elongation and the center line of said upper end of said bladder member is retained substantially coincident with the longitudinal axis of said vessel and casing upon expansion thereof.

2. An accumulator in accordance with claim 1 wherein the said portion of said bladder pressed between said upper ends of said vessel and casing is thicker than the adjacent surrounding portions of said bladder, whereby the principal expansion of said bladder is limited to the areas between said pressed portions and collar portion.

3. An accumulator as set forth in claim 2 in which the upper end of said casing has a central depression and the central thicker portion of said bladder has a depending protruberance, adapted to be seated in said central depression.

4. An accumulator in accordance with claim 2 wherein the length of said cylindrical section of said pressure vessel is approximately equal to the total axial extent of said parti-spherical end portions.

5. An accumulator in accordance with claim 1 wherein the length of said cylindrical section is approximately equal to the total axial extend of said parti-spherical end portions.

6. An accumulator in accordance with claim 5 wherein said casing includes at the lower end thereof an outwardly projecting annular shoulder, the outer diameter of said shoulder conforming essentially to the inner diameter of said neck, the combination including means on said neck, engaging said lower end of said casing for locking said casing against axial outward movement relative to said neck.

7. An accumulator in accordance with claim 6 wherein said means for locking said casing against axial outward movement comprises an annular inturned portion of said neck.

8. An accumulator in accordance with claim 6 wherein said means for locking said casing against axial outward movement comprises a fitting weldingly connected to said neck, said fitting including an upper shoulder portion in engagement with said lower end of said casing.

9. An accumulator in accordance with claim 1 wherein said seal is defined by radially inwardly deformed portions of said neck.

10. An accumulator in accordance with claim 1 in which the inner diameter of said neck portion is greater than one-half the inner diameter of said cylindrical section.

* * * * *